(12) United States Patent
Mallik et al.

(10) Patent No.: US 9,886,354 B1
(45) Date of Patent: Feb. 6, 2018

(54) HANDLING ABORTS OF BACKUP OPERATIONS

(71) Applicant: EMC Corporation, Hopkinton, MA (US)

(72) Inventors: Shubhashish Mallik, Bangalore (IN); Satyendra Nath Sharma, Bangalore (IN); Challa Dharmateja, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 19 days.

(21) Appl. No.: 14/674,018

(22) Filed: Mar. 31, 2015

(51) Int. Cl.
   *G06F 11/14* (2006.01)
   *G06F 11/16* (2006.01)

(52) U.S. Cl.
   CPC ...... *G06F 11/1469* (2013.01); *G06F 11/1435* (2013.01); *G06F 11/1453* (2013.01); *G06F 11/1662* (2013.01); *G06F 2201/84* (2013.01)

(58) Field of Classification Search
   CPC .................................. G06F 11/1446–11/1469
   See application file for complete search history.

(56) References Cited

U.S. PATENT DOCUMENTS

| | | | | |
|---|---|---|---|---|
| 7,080,225 B1 * | 7/2006 | Todd | ...................... | G06F 3/061 711/154 |
| 2002/0188802 A1 * | 12/2002 | Yagisawa | ............ | G06F 12/0804 711/113 |
| 2003/0097533 A1 * | 5/2003 | Maeda | ................. | G06F 11/1466 711/162 |
| 2007/0136389 A1 * | 6/2007 | Bergant | .............. | G06F 11/1435 |
| 2008/0184063 A1 * | 7/2008 | Abdulvahid | ........ | G06F 11/1469 714/6.3 |
| 2009/0228670 A1 * | 9/2009 | Nakagawa | .......... | G06F 11/1464 711/162 |
| 2010/0115305 A1 * | 5/2010 | Ichikawa | .............. | G06F 1/3203 713/320 |
| 2011/0055499 A1 * | 3/2011 | Sasson | ................ | G06F 11/2082 711/162 |
| 2012/0310894 A1 * | 12/2012 | Freedman | ........... | G06F 11/1402 707/674 |
| 2013/0054533 A1 * | 2/2013 | Hao | ........................ | G06F 17/30 707/649 |
| 2015/0309739 A1 * | 10/2015 | Sato | .................... | G06F 11/1435 711/162 |

OTHER PUBLICATIONS

Little et al. Digital Data Integrity. 2007. John Wiley & Sons. pp. 31-39.*
Felix et al. "Helper snapshot not removed when vStorage API job is stopped." 2009. https://forums.veeam.com/veeam-backup-replication-f2/helper-snapshot-not-removed-when-vstorage-api-job-is-stopped-t2075.html.*

* cited by examiner

Primary Examiner — Nathan Sadler
(74) Attorney, Agent, or Firm — Dergosits & Noah LLP; Todd A. Noah

(57) ABSTRACT

Handling aborts of backup operations is described. A system receives an abort request message corresponding to a backup operation associated with a source storage device. The system determines whether a snapshot associated with the backup operation is created of the source storage device. The system synchronizes the source storage device with a target storage device in response to a determination that the snapshot associated with the backup operation is created of the source storage device. The system sends an abort completion message to a backup/restore application interface associated with the backup operation.

20 Claims, 3 Drawing Sheets

HANDLING ABORTS OF BACKUP OPERATIONS

BACKGROUND

If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired point in time when the data object was in this state, and instructs the backup/restore application to execute a restore operation to restore a copy of the corresponding backup files for that state to the data object.

A snapshot is a capture of a state of a data object, such as a file system or an application, at a specific moment in time. A data object may be stored on a storage array, which is a disk storage system that includes multiple disk drives. Unlike a disk enclosure, a storage array has cache memory and advanced functionality, such as virtualization and Redundant Array of Independent Disks (RAID). A data protection administrator may manage a backup/restore application to create snapshots of data objects stored on multiple storage arrays.

DETAILED DESCRIPTION

Figure 1:
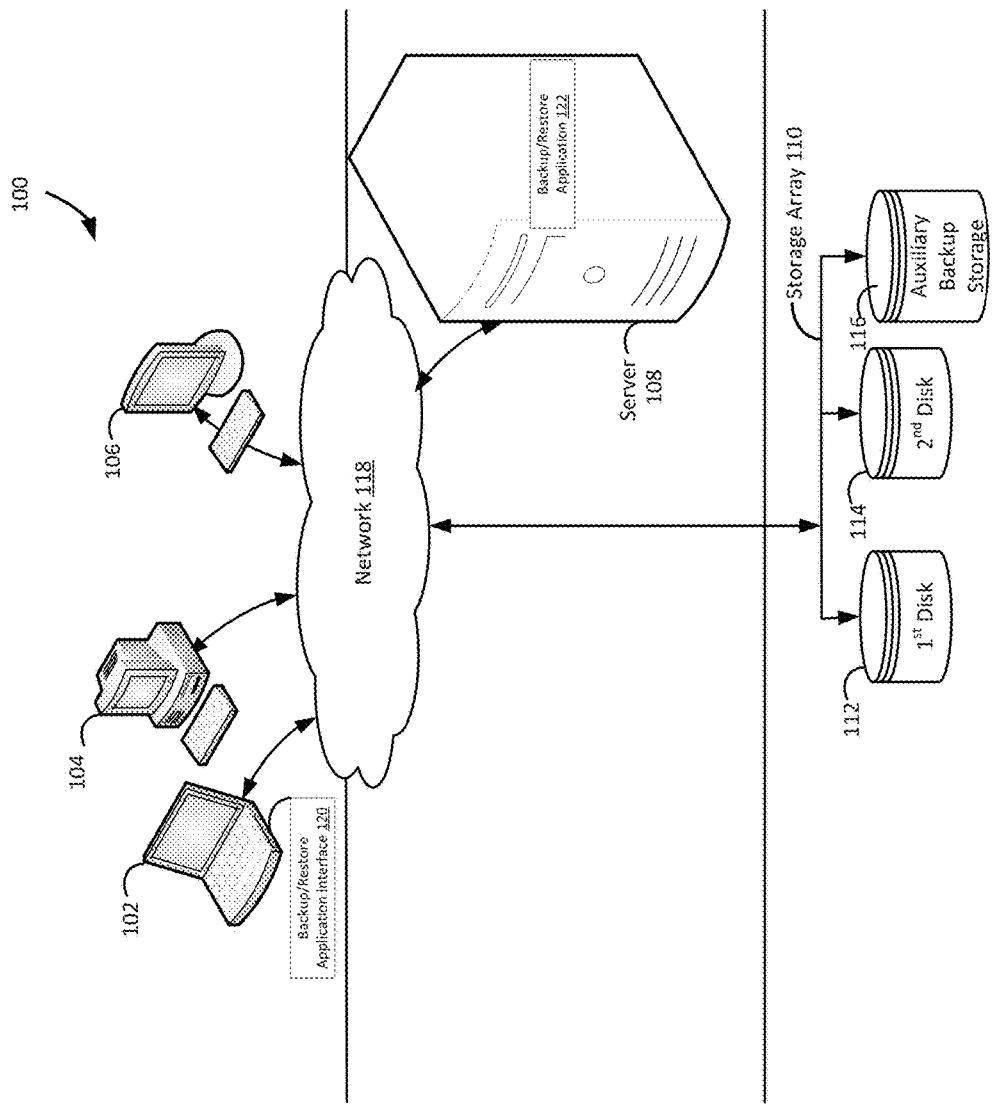
FIG. 1 illustrates a block diagram of an example system for handling aborts of backup operations, under an embodiment.

When using snapshot methodologies to provide backups, legacy processes synchronize source storage devices with target storage devices and then make sure that data on the source storage devices is unchanged while creating a snapshot of the data by temporarily disabling any writes to the source storage devices. For example, when a backup operation is required for multiple servers, legacy processes flush pending writes from the servers' memories to the servers' storage devices, temporarily disable any write requests to the servers' storage devices, identify available target storage devices for mirroring the servers' storage devices, synchronize the servers' storage devices with the available target storage devices, snapshot the data in the servers' storage devices by splitting the synchronized target storage devices from the servers' storage devices, and then enable any write requests to the servers' storage devices. Although this example describes creating a snapshot by splitting the synchronized target storage devices from the source storage devices, for a copy-on write a target storage device may be de-synchronized from a source storage device to create a snapshot at the point in time of de-synchronization, and then all writes following the de-synchronization may be sent to a different target storage device.

In yet another example of creating a snapshot, each write may be tracked using a separate target storage device, such that any of these writes can be bookmarked, or labeled as a snapshot, thereby enabling a user to reference any point in time using the tracked writes. When a system user requests to abort a currently executing backup operation, a backup/restore application interface forwards the abort request to other processes which are involved in the various stages of the backup operation, waits for a while, and then exits the processing of the abort request, assuming that the abort request was handled correctly by all of the other processes involved in the backup operation. However, these other processes may not return the storage devices to their previous state because some of these processes may not have finished when the backup/restore application interface exited the processing of the abort request. Therefore, the target storage devices may not be synchronized with the source storage devices or write requests may not be enabled to the source storage devices, which are problems that lead to a lower total customer experience.

Embodiments herein handle aborts of backup operations. An abort request message is received, corresponding to a backup operation associated with a source storage device. The source storage device is synchronized with a target storage device if a snapshot associated with the backup operation is created of the source storage device. An abort completion message is sent to a backup/restore application interface associated with the backup operation. For example, a backup/restore application receives an abort request message for the backup of a personal computer. The backup/restore application synchronizes the personal computer with a storage array disk if a snapshot has been created of the personal computer. The backup/restore application sends an abort completion message to a backup/restore application interface for the backup operation, which indicates that the personal computer is synchronized with the storage array disk.

The backup/restore application responds to an abort request by explicitly re-synchronizing source storage devices with their target storage devices if these storage devices were synchronized when the aborted backup operation began, leaving the system in the state which the system was in when the backup operation began, thereby overcoming challenges in the legacy abort process. The backup/restore application may take different actions depending upon the point that the backup operation was in when the abort request was received. The backup/restore application may permit a backup helper process to continue executing if the backup helper process is almost complete if the immediate aborting of the backup helper process is less efficient. The backup/restore application ensures that source storage devices are returned to the state which they were in prior to the receipt of the abort request, which results in a higher total customer experience. The backup/restore application overcomes the legacy presumption that abort processes correctly handled abort requests of backup operations for source storage devices.

FIG. 1 illustrates a block diagram of a system that implements handling aborts of backup operations, under an embodiment. As shown in FIG. 1, a system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as a laptop 102, the second client 104 as a personal computer 104, and the third client 106 as an iMac® 106, each of the clients 102-106 may be any type of computer, such as a server. The storage array 110 includes a first disk 112, a second disk 114, and an auxiliary storage device 116. The clients 102-106, the server 108, and the storage array 110 communicate via a network 118. Although FIG. 1 depicts the system 100 with three clients 102-106, one server 108, one storage array 110, two disks 112-114, one auxiliary storage device 116, and one network 118, the system 100 may include any number of clients 102-106, any number of servers 108, any number of storage arrays 110, any number of disks 112-114, any number of auxiliary storage devices 116, and any number of networks 118. The clients 102-106 and the server 108 may each be substantially similar to the system 300 depicted in FIG. 3 and described below.

The first client includes a backup/restore application interface 120, such as the backup software interface provided by Medical Information Technology, Inc., which enables a system user to interface with a backup/restore application 122. The backup/restore application 122 creates snapshots of data objects for the clients 104-106, by synchronizing the disks 112-114 with the clients 104-106. The system 100 enables the backup/restore application 122 to execute a rollback based on the snapshots. FIG. 1 depicts the backup/restore application 122 residing completely on the server 108, but the backup/restore application 122 may reside completely on the clients 102-106, or in any combination of partially on the server 108 and partially on the clients 102-106. Although the following paragraphs describe EMC Corporation's Avamar® backup/restore application and EMC Corporation's NetWorker® backup/restore application as examples of the backup/restore application 122, the backup/restore application 122 may be any other backup/restore application which provides the backup/restore functionalities described in the Background section.

The backup/restore application 122 may be EMC Corporation's Avamar® backup/restore application, which provides fast, efficient backup and recovery through a complete software and hardware solution. Equipped with integrated variable-length deduplication technology, EMC Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for immediate single-step restore. The transmission of deduplicated backup sends only changed blocks, reducing network traffic. EMC Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. EMC Corporation's Avamar® data store features redundant power and networking, redundant array of independent disks, and redundant array of inexpensive nodes technology to provide uninterrupted data accessibility. Periodic data systems checks ensure recoverability whenever needed. EMC Corporation's Avamar® systems can be deployed in an integrated solution with EMC Corporation's Data Domain® systems for high-speed backup and recovery of specific data types.

The backup/restore application 122 may be an EMC Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data can be sent to a remote NetWorker® storage node or stored on a locally attached device by the use of a dedicated storage node. EMC Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 122 receives an abort request message, corresponding to a backup operation associated with a source storage device, from the backup/restore application interface 120 and/or a system associated with the backup operation, such as the personal computer 104. For example, a user of the first client 102 sends an abort request, for the backup of the personal computer 104, to the backup/restore application 122, via the backup/restore application interface 120. After the abort request is received, the backup/restore application 122 can terminate a backup operation if the backup operation has not begun to execute with respect to a source storage device. For example, the backup/restore application 122 terminates the backup operation for the personal computer 104 because the backup operation has not begun to execute with respect to the personal computer 104, such that no cleanup action is required.

After determining whether a backup operation has begun to execute with respect to a source storage device, the backup/restore application 122 can either continue or terminate identification of a target storage device as available for a source storage device, based on an amount of identifying the target storage device as available for the source storage device. For example, the backup/restore application 122 continues the identification of 100 target storage devices as available for mirroring the data of 100 source storage devices because the identification process has already identified 99 of the 100 target storage devices, such that completing the identification process would faster than terminating the identification process. In another example, the backup/restore application 122 terminates the identification of 100 target storage devices as available for mirroring the data of 100 source storage devices because the identification process has not identified more than 1 of the 100 target storage devices. Although these examples describe terminating or continuing the identification process based on a threshold between 1% and 99% of the identification process, the backup/restore application 122 may use any threshold for terminating or continuing the identification process.

After determining whether a target storage device is being identified as available for a source storage device, the backup/restore application 122 can either continue or terminate synchronization of a target storage device with a source storage device, based on an amount of synchronizing the target storage device with the source storage device. For example, the backup/restore application 122 completes the synchronization of the first disk 112 with the personal computer 104 because the first disk 112 is already synchronized with 99% of the data on the personal computer 104, such that completing the synchronization process would be faster than terminating the synchronization process. In another example, the backup/restore application 122 terminates the synchronization of the first disk 112 with the personal computer 104 because the synchronization process has not synchronized the first disk 112 with more than 1% of the data on the personal computer 104. Although these examples describe terminating or continuing the synchronization process based on a threshold between 1% and 99% of the synchronization process, the backup/restore application 122 may use any threshold for terminating or continuing the synchronization process.

After determining whether a target storage device is being synchronized with a source storage device, the backup/restore application 122 can continue or terminate a process of saving data from the target storage device to an auxiliary storage device, based on an amount of saving data from the target storage device to the auxiliary storage device. For example, the backup/restore application 122 completes the process of saving data from the first disk 112 to the auxiliary backup storage 116 because 99% of the data on the first disk 112 is already saved to the auxiliary backup storage 116, such that completing the process of saving data from the first disk 112 to the auxiliary backup storage 116 would be faster than terminating the process of saving data from the first disk 112 to the auxiliary backup storage 116. In another example, the backup/restore application 122 terminates the process of saving data from the first disk 112 to the auxiliary backup storage 116 because the process of saving data from the first disk 112 to the auxiliary backup storage 116 has not saved more than 1% of the data on the first disk 112 to the auxiliary backup storage 116. Although these examples describe terminating or continuing the data saving process based on a threshold between 1% and 99% of the data saving process, the backup/restore application 122 may use any threshold for terminating or continuing the data saving process. If a process was saving data from a target storage device to an auxiliary storage device, the backup/restore application 122 can un-mount the target storage device and delete data from the auxiliary storage device. For example, the backup/restore application 122 unmounts the first disk 112, and deletes the snapshot from the auxiliary backup storage 116 which was provided by the first disk 112.

The backup/restore application 122 synchronizes a source storage device with a target storage device if a snapshot associated with a backup operation is created of the source storage device. For example, the backup/restore application 122 synchronizes the personal computer 104 with the first disk 112 because a snapshot has been created of the personal computer 104. If a snapshot associated with a backup operation is created of a source storage device, the backup/restore application 122 can send a request, via a backup/restore application interface, to enable any write commands to the source storage device. For example, the backup/restore application 122 sends a request, via the backup/restore application interface 120, to enable any write commands to the personal computer 104, which has been synchronized with the first disk 112.

After determining the state of the backup process executing when the abort request was received, and conducting appropriate actions based on that state of the executing backup process, the backup/restore application 122 sends an abort completion message to a backup/restore application interface associated with a backup operation. For example, the backup/restore application 122 sends an abort completion message to the backup/restore application interface 120 for the backup operation, confirming that the personal computer 104 has been synchronized with the first disk 112 and that any write commands to the personal computer 104 are enabled. The backup/restore application 122 may permit a backup helper process to continue executing if the backup helper process is almost complete if the immediate aborting of the backup helper process is less efficient.

Figure 2:
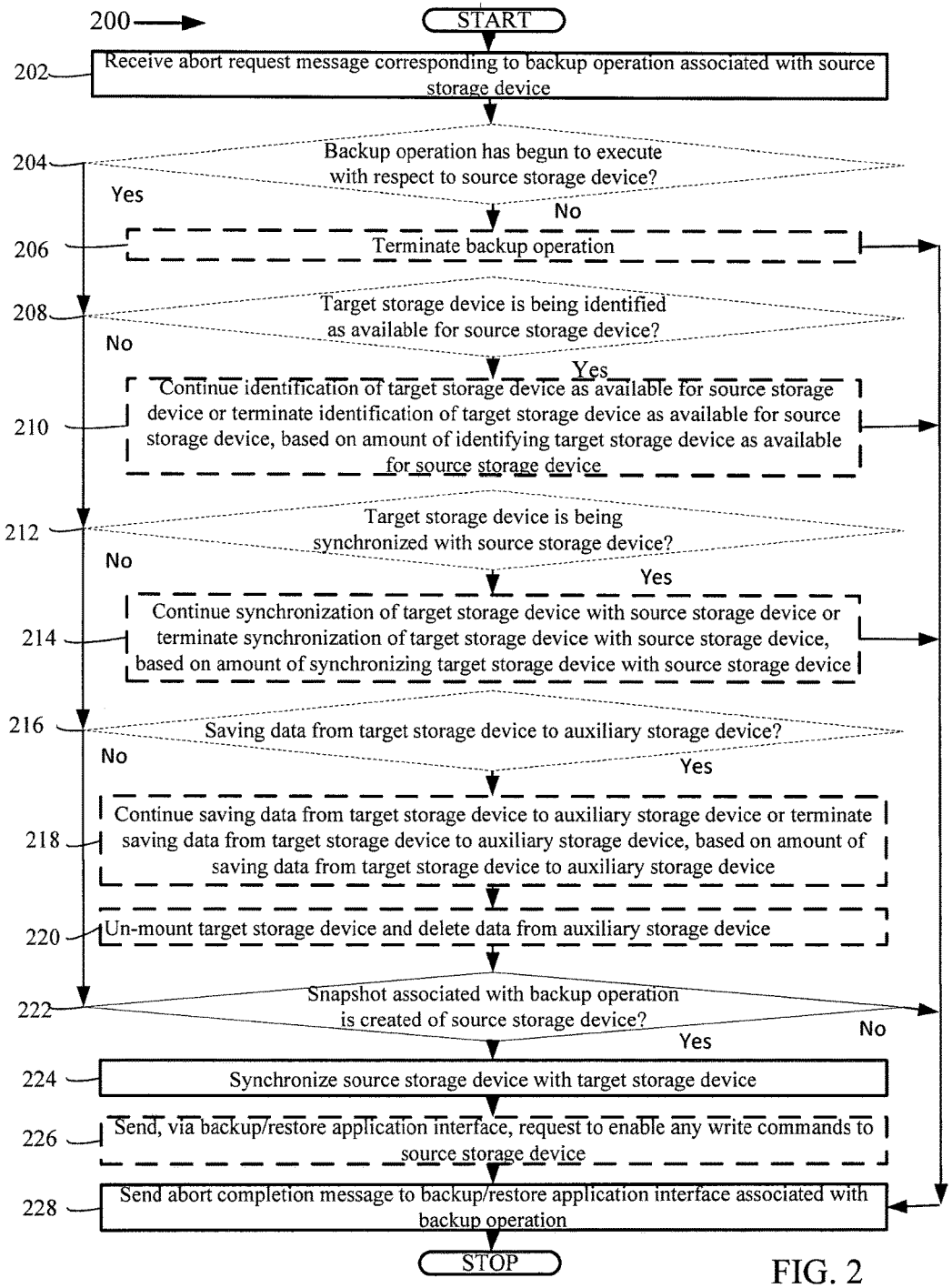
FIG. 2 is a flowchart that illustrates a method of handling aborts of backup operations, under an embodiment.

FIG. 2 is a flowchart that illustrates a method for handling aborts of backup operations, under an embodiment. Flowchart 200 illustrates method acts illustrated as flowchart blocks for certain steps involved in and/or between the clients 102-106 and/or the server 108 of FIG. 1.

The flowchart 200 begins when an abort request message is received, corresponding to a backup operation associated with a source storage device, block 202. For example, a user of the first client 102 sends an abort request, for the backup of the personal computer 104, to the backup/restore application 122, via the backup/restore application interface 120. After receiving the abort request message, a determination is optionally made whether a backup operation has begun to execute with respect to a source storage device, block 204. For example, the backup/restore application 122 determines whether a backup operation has begun to execute with respect to the personal computer 104. If a backup operation has not begun to execute with respect to a source storage device, the flowchart 200 continues to block 206. If a backup operation has begun to execute with respect to a source storage device, the flowchart 200 proceeds to block 208 to identify other processes for terminating. If a backup operation has not begun to execute with respect to a source storage device, the backup operation is optionally terminated, block 206. For example, the backup/restore application 122 terminates the backup operation because the backup operation has not begun to execute with respect to the personal computer 104. Then the flowchart 200 proceeds to block 228 to send an abort completion message.

If a backup operation has begun to execute with respect to a source storage device, a determination is optionally made whether a target storage device is being identified as available for a source storage device, block 208. For example, the backup/restore application 122 determines whether 100 target storage devices are identified as available for mirroring the data of 100 source storage devices. If a target storage device is being identified as available for a source storage device, the flowchart 200 continues to block 210. If a target storage device is not being identified as available for a source storage device, the flowchart 200 proceeds to block 212 to identify other processes for terminating. If a target storage device is being identified as available for a source storage device, identification of the target storage device as available for the source storage device is optionally continued or terminated, based on an amount of identifying the target storage device as available for the source storage device, block 210. For example, the backup/restore application 122 terminates the identification of 100 target storage devices as available for mirroring the data of 100 source storage devices because the identification process has not identified more than 1 of the 100 target storage devices. Then the flowchart 200 proceeds to block 228 to send an abort completion message.

If a target storage device is not being identified as available for a source storage device, a determination is optionally made whether the target storage device is being synchronized with the source storage device, block 212. For example, the backup/restore application 122 determines whether the first disk 112 is being synchronized with the personal computer 104. If a target storage device is being synchronized with a source storage device, the flowchart 200 continues to block 214. If a target storage device is not being synchronized with a source storage device, the flowchart 200 proceeds to block 216 to identify other processes for terminating. If a target storage device is being synchronized with a source storage device, synchronization of the target storage device with the source storage device is optionally continued or terminated, based on an amount of synchronizing the target storage device with the source storage device, block 214. For example, the backup/restore application 122 terminates the synchronization of the first disk 112 with the personal computer 104 because the synchronization process has not synchronized the first disk 112 with more than 1% of the data on the personal computer 104. Then the flowchart 200 proceeds to block 228 to send an abort completion message.

If a target storage device is not being synchronized with a source storage device, a determination is optionally made whether a process is saving data from a target storage device to an auxiliary storage device, block 216. For example, the backup/restore application 122 determines whether data is being saved from the first disk 112 to the auxiliary backup storage 116. If a process is saving data from a target storage device to an auxiliary storage device, the flowchart 200 continues to block 218. If a process is not saving data from a target storage device to an auxiliary storage device, the flowchart 200 proceeds to block 222 to identify other processes for terminating. If a process is saving data from a target storage device to an auxiliary storage device, the data saving process is optionally continued or terminated, based on an amount of saving data from the target storage device to the auxiliary storage device, block 218. For example, the backup/restore application 122 terminates the process of saving data from the first disk 112 to the auxiliary backup storage 116 because the process of saving data from the first disk 112 to the auxiliary backup storage 116 has not saved more than 1% of the data on the first disk 112 to the auxiliary backup storage 116. Since a process is saving data from a target storage device to an auxiliary storage device, the target storage device is un-mounted; and data is deleted from the auxiliary storage device, block 220. For example, the backup/restore application 122 unmounts the first disk 112, and deletes the snapshot from the auxiliary backup storage 116 which was provided by the first disk 112. Then the flowchart 200 continues to block 222 to identify other processes for terminating.

A determination is made whether a snapshot associated with a backup operation is created of a source storage device, block 222. For example, the backup/restore application 122 determines whether a snapshot has been created of the personal computer 104. If a snapshot associated with a backup operation is created of a source storage device, the flowchart 200 continues to block 224. If a snapshot associated with a backup operation is not created of a source storage device, the flowchart 200 proceeds to block 228 to send an abort completion message. If a snapshot associated with a backup operation is created of a source storage device, the source storage device is synchronized with a target storage device, block 224. For example, the backup/restore application 122 synchronizes the personal computer 104 with the first disk 112 because a snapshot has been created of the personal computer 104. Since snapshots can use different technologies other than mirrored target storage devices, the termination of snapshots also can take different forms based on the snapshot technology used. For example, to terminate a copy-on-write snapshot, the write tracking sessions are ended. In the case of bookmarks, the bookmark which was created for snapshot could be removed from the database. Since a source storage device is synchronized with a target storage device, a request is optionally sent, via a backup/restore application interface, to enable any write commands to the source storage device, block 226. For example, the backup/restore application 122 sends a request, via the backup/restore application interface 120, to enable any write commands to the personal computer 104, which has been synchronized with the first disk 112.

After determining the state of a backup process executing when an abort request was received, and conducting appropriate actions based on that state of the executing backup process, an abort completion message is sent to a backup/restore application interface associated with a backup operation, block 228. For example, the backup/restore application 122 sends an abort completion message to the backup/restore application interface 120 for the backup operation, confirming that the personal computer 104 has been synchronized with the first disk 112 and that any write commands to the personal computer 104 are enabled. The backup/restore application 122 may permit a backup helper process to continue executing if the backup helper process is almost complete if the immediate aborting of the backup helper process is less efficient.

Although FIG. 2 depicts the blocks 202-228 occurring in a specific order, the blocks 202-228 may occur in another order. In other implementations, each of the blocks 202-228 may also be executed in combination with other blocks and/or some blocks may be divided into a different set of blocks.

Figure 3:
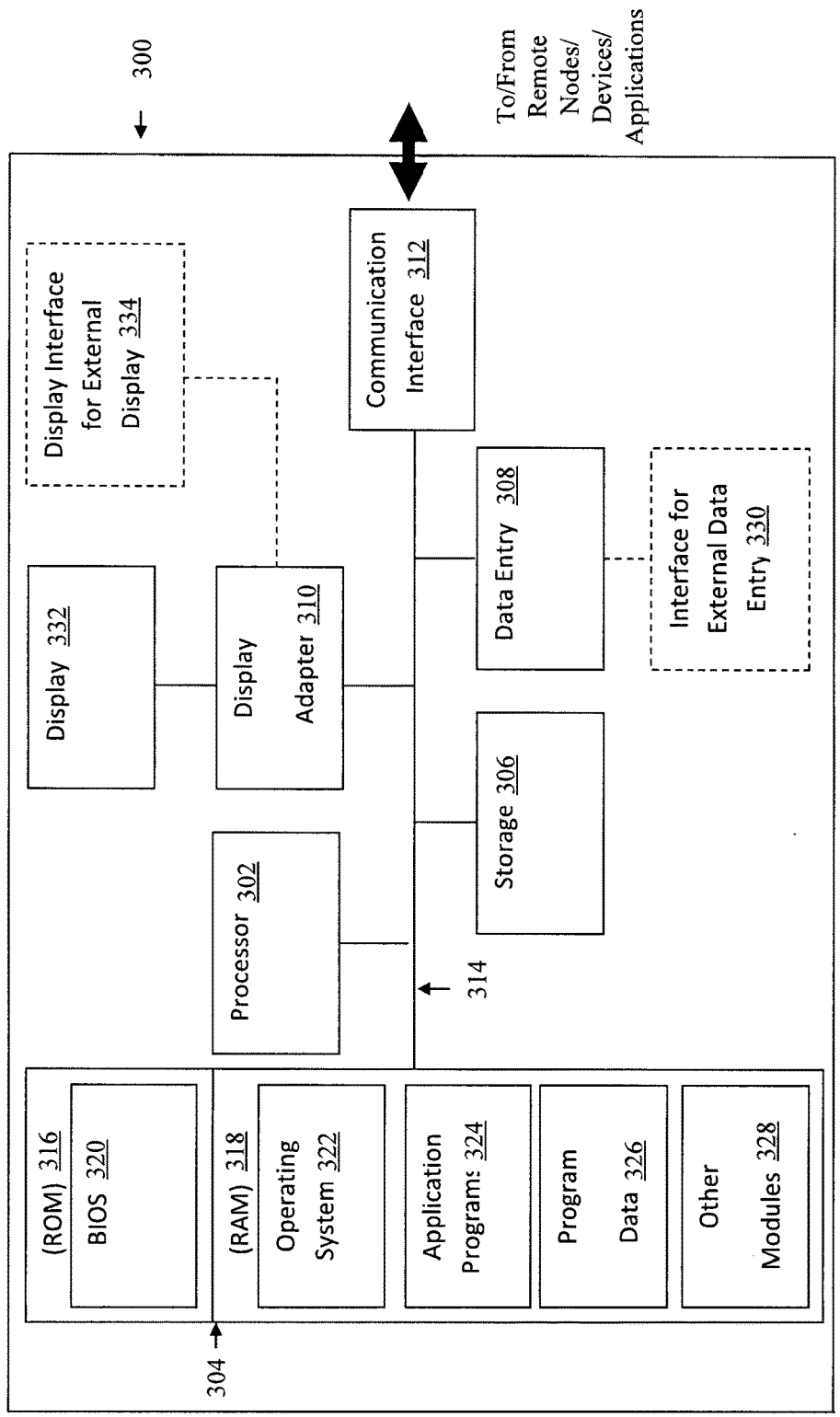
FIG. 3 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 3 may vary depending on the system implementation. With reference to FIG. 3, an exemplary system for implementing the subject matter disclosed herein includes a hardware device 300, including a processing unit 302, memory 304, storage 306, a data entry module 308, a display adapter 310, a communication interface 312, and a bus 314 that couples the elements 304-312 to the processing unit 302.

The bus 314 may comprise any type of bus architecture. Examples include a memory bus, a peripheral bus, a local bus, etc. The processing unit 302 is an instruction execution machine, apparatus, or device and may comprise a microprocessor, a digital signal processor, a graphics processing unit, an application specific integrated circuit (ASIC), a field programmable gate array (FPGA), etc. The processing unit 302 may be configured to execute program instructions stored in the memory 304 and/or the storage 306 and/or received via the data entry module 308.

The memory 304 may include read only memory (ROM) 316 and random access memory (RAM) 318. The memory 304 may be configured to store program instructions and data during operation of the hardware device 300. In various embodiments, the memory 304 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 304 may also include nonvolatile memory technologies such as nonvolatile flash RAM (NVRAM) or ROM. In some embodiments, it is contemplated that the memory 304 may include a combination of technologies such as the foregoing, as well as other technologies not specifically mentioned. When the subject matter is implemented in a computer system, a basic input/output system (BIOS) 320, containing the basic routines that help to transfer information between elements within the computer system, such as during start-up, is stored in the ROM 316.

The storage 306 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 300.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 306, the ROM 316 or the RAM 318, including an operating system 322, one or more applications programs 324, program data 326, and other program modules 328. A user may enter commands and information into the hardware device 300 through the data entry module 308. The data entry module 308 may include mechanisms such as a keyboard, a touch screen, a pointing device, etc. Other external input devices (not shown) are connected to the hardware device 300 via an external data entry interface 330. By way of example and not limitation, external input devices may include a microphone, joystick, game pad, satellite dish, scanner, or the like. In some embodiments, external input devices may include video or audio input devices such as a video camera, a still camera, etc. The data entry module 308 may be configured to receive input from one or more users of the hardware device 300 and to deliver such input to the processing unit 302 and/or the memory 304 via the bus 314.

A display 332 is also connected to the bus 314 via the display adapter 310. The display 332 may be configured to display output of the hardware device 300 to one or more users. In some embodiments, a given device such as a touch screen, for example, may function as both the data entry module 308 and the display 332. External display devices may also be connected to the bus 314 via an external display interface 334. Other peripheral output devices, not shown, such as speakers and printers, may be connected to the hardware device 300.

The hardware device 300 may operate in a networked environment using logical connections to one or more remote nodes (not shown) via the communication interface 312. The remote node may be another computer, a server, a router, a peer device or other common network node, and typically includes many or all of the elements described above relative to the hardware device 300. The communication interface 312 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 312 may include logic configured to support direct memory access (DMA) transfers between the memory 304 and other devices.

In a networked environment, program modules depicted relative to the hardware device 300, or portions thereof, may be stored in a remote storage device, such as, for example, on a server. It will be appreciated that other hardware and/or software to establish a communications link between the hardware device 300 and other devices may be used.

It should be understood that the arrangement of the hardware device 300 illustrated in FIG. 3 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 300.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 3.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for handling aborts of backup operations, the method comprising:
    receiving an abort request message corresponding to a backup operation associated with a source storage device;
    determining, in response to receiving the abort request message, whether a snapshot associated with the current backup operation that corresponds to the received abort request message has been created of the source storage device, the snapshot being created by synchronizing the source storage device and the target device;
    re-synchronizing the source storage device with the target storage device in response to the determination that the snapshot associated with the current backup operation that corresponds to the received abort request message has been created of the source storage device; and
    sending an abort completion message to a backup/restore application interface associated with the current backup operation, the abort completion message being sent after the source storage device has been re-synchronized with the target source device.

2. The method of claim 1, wherein the abort request message is received from at least one of the backup/restore application interface and a system associated with the backup operation.

3. The method of claim 1, wherein the method further comprises:
    determining whether the backup operation has begun to execute with respect to the source storage device; and
    terminating the backup operation in response to a determination that the backup operation has not begun to execute with respect to the source storage device.

4. The method of claim 1, wherein the method further comprises:
    determining whether the target storage device is being identified as available for the source storage device; and
    executing one of continue identification of the target storage device as available for the source storage device and terminate identification of the target storage device as available for the source storage device, based on an amount of identifying the target storage device as available for the source storage device, in response to a determination that the target storage device is being identified as available for the source storage device.

5. The method of claim 1, wherein the method further comprises:
    determining whether the target storage device is being synchronized with the source storage device; and
    executing one of continue synchronization of the target storage device with the source storage device and terminate synchronization of the target storage device with the source storage device, based on an amount of synchronizing the target storage device with the source storage device, in response to a determination that the target storage device is being synchronized with the source storage device.

6. The method of claim 1, wherein the method further comprises:
    determining whether a process is saving data from the target storage device to an auxiliary storage device;
    executing one of continue the process of saving data from the target storage device to the auxiliary storage device and terminate the process of saving data from the target storage device to the auxiliary storage device, based on an amount of saving data from the target storage device to the auxiliary storage device, in response to a determination that the process is saving data from the target storage device to the auxiliary storage device;
    un-mounting the target storage device; and
    deleting the data from the auxiliary storage device.

7. The method of claim 1, wherein the method further comprises sending, via the backup/restore application interface, a request to enable any write commands to the source storage device in response to the determination that the snapshot associated with the backup operation is created of the source storage device.

8. A computer program product, comprising a non-transitory computer-readable medium having a computer-readable program code embodied therein to be executed by one or more processors, the program code including instructions to:
    receive an abort request message corresponding to a current backup operation associated with a source storage device;
    determine, in response to receiving the abort request message, whether a snapshot associated with the current backup operation that corresponds to the received abort request message has been created of the source storage device, the snapshot being created by synchronizing the source storage device and the target device;

re-synchronize the source storage device with the target storage device in response to the determination that the snapshot associated with the current backup operation that corresponds to the received abort request message has been created of the source storage device; and send an abort completion message to a backup/restore application interface associated with the current backup operation, the abort completion message being sent after the source storage device has been re-synchronized with the target source device.

9. The computer program product of claim 8, wherein the program code further includes instructions to:

determine whether the backup operation has begun to execute with respect to the source storage device; and terminate the backup operation in response to a determination that the backup operation has not begun to execute with respect to the source storage device.

10. The computer program product of claim 8, wherein the program code further includes instructions to:

determine whether the target storage device is being identified as available for the source storage device; and execute one of continue identification of the target storage device as available for the source storage device and terminate identification of the target storage device as available for the source storage device, based on an amount of identifying the target storage device as available for the source storage device, in response to a determination that the target storage device is being identified as available for the source storage device.

11. The computer program product of claim 8, wherein the program code further includes instructions to:

determine whether the target storage device is being synchronized with the source storage device; and execute one of continue synchronization of the target storage device with the source storage device and terminate synchronization of the target storage device with the source storage device, based on an amount of synchronizing the target storage device with the source storage device, in response to a determination that the target storage device is being synchronized with the source storage device.

12. The computer program product of claim 8, wherein the program code further includes instructions to:

determine whether a process is saving data from the target storage device to an auxiliary storage device;

execute one of continue the process of saving data from the target storage device to the auxiliary storage device and terminate the process of saving data from the target storage device to the auxiliary storage device, based on an amount of saving data from the target storage device to the auxiliary storage device, in response to a determination that the process is saving data from the target storage device to the auxiliary storage device;

un-mount the target storage device; and delete the data from the auxiliary storage device.

13. The computer program product of claim 8, wherein the program code further includes instructions to send, via the backup/restore application interface, a request to enable any write commands to the source storage device in response to the determination that the snapshot associated with the backup operation is created of the source storage device.

14. A system for handling aborts of backup operations, the system comprising:

one or more processors; and non-transitory computer-readable medium storing a processor-based application, the processor-based application including instructions which when executed will cause the one or more processors to:

receive an abort request message corresponding to a current backup operation associated with a source storage device;

determine, in response to receiving the abort request message, whether a snapshot associated with the current backup operation that corresponds to the received abort request message has been created of the source storage device, the snapshot being created by synchronizing the source storage device and the target device;

re-synchronize the source storage device with the target storage device in response to the determination that the snapshot associated with the current backup operation that corresponds to the received abort request message has been created of the source storage device; and send an abort completion message to a backup/restore application interface associated with the current backup operation, the abort completion message being sent after the source storage device has been re-synchronized with the target source device.

15. The system of claim 14, wherein the abort request message is received from at least one of the backup/restore application interface and a system associated with the backup operation.

16. The system of claim 14, wherein the processor-based application further causes the processor to:

determine whether the backup operation has begun to execute with respect to the source storage device; and terminate the backup operation in response to a determination that the backup operation has not begun to execute with respect to the source storage device.

17. The system of claim 14, wherein the processor-based application further causes the processor to:

determine whether the target storage device is being identified as available for the source storage device; and execute one of continue identification of the target storage device as available for the source storage device and terminate identification of the target storage device as available for the source storage device, based on an amount of identifying the target storage device as available for the source storage device, in response to a determination that the target storage device is being identified as available for the source storage device.

18. The system of claim 14, wherein the processor-based application further causes the processor to:

determine whether the target storage device is being synchronized with the source storage device; and execute one of continue synchronization of the target storage device with the source storage device and terminate synchronization of the target storage device with the source storage device, based on an amount of synchronizing the target storage device with the source storage device, in response to a determination that the target storage device is being synchronized with the source storage device.

19. The system of claim 14, wherein the processor-based application further causes the processor to:

determine whether a process is saving data from the target storage device to an auxiliary storage device;

execute one of continue the process of saving data from the target storage device to the auxiliary storage device and terminate the process of saving data from the target storage device to the auxiliary storage device, based on an amount of saving data from the target storage device to the auxiliary storage device, in response to a determination that the process is saving data from the target storage device to the auxiliary storage device;

un-mount the target storage device; and delete the data from the auxiliary storage device.

20. The system of claim 14, wherein the processor-based application further causes the processor to send, via the backup/restore application interface, a request to enable any write commands to the source storage device in response to the determination that the snapshot associated with the backup operation is created of the source storage device.

* * * * *